United States Patent Office 2,823,229
Patented Feb. 11, 1958

2,823,229

PRODUCTION OF TEREPHTHALIC ACID

Bernhard Raecke, Dusseldorf, Germany, assignor to Henkel & Cie, G. m. b. H., Dusseldorf-Holthausen, Germany, a corporation of Germany No Drawing. Application June 20, 1956
Serial No. 592,505

Claims priority, application Germany December 5, 1952

17 Claims. (Cl. 260—515)

This invention relates to an improved process of producing terephthalic acid and its derivatives, and more particularly to a process of producing terephthalic acid and its derivatives by using benzoic acid as a starting material.

It is known that salts of terephthalic acid are obtained by heating the sodium salt of benzoic acid until it becomes charred or by fusing the potassium salt of benzoic acid with sodium formate directly over a flame. However, when proceeding in this manner the yields of terephthalic acid are very small. Furthermore, the non-reacted salts are completely destroyed due to charring.

It is one object of this invention to provide a simple and effective process of producing terephthalic acid by using benzoic acid as starting material, whereby a substantial yield of terephthalic acid is obtained and a considerable amount of unreacted benzoic acid is recovered.

Another object of my invention is to convert benzoic acid into terephthalic acid by subjecting a salt of benzoic acid to heat and pressure in a substantially oxygen-free inert atmosphere.

Various other objects and advantages of this invention will become apparent as the description proceeds.

The preferred process of my invention consists in heating the potassium salt of benzoic acid in the presence of carbon dioxide to elevated temperatures, whereby a carboxyl group is introduced in para-position to the carboxyl group present in benzoic acid salt. In general, temperatures above 340° C. are required to achieve sufficiently rapid reaction for technical purposes. Moreover, it is necessary to carry out the reaction in the absence of oxygen in order to avoid decomposition of the organic material at such high temperatures. Traces of oxygen, if present, do not prevent the reaction, but reduce the yields. Preferably the benzoate is heated in an autoclave provided with a stirring device in the presence of carbon dioxide under pressure in excess of atmospheric pressure. However, atmospheric or subatmospheric pressure may be used and other inert gases such as nitrogen, carbon monoxide, ammonia gas, methane, ethane, propane, benzene and other hydrocarbon gases, or mixtures of said gases or other gases, may be used. Noble gases may likewise be used to provide the inert atmosphere but will normally not be used because of their cost.

The invention in its broadest aspect comprises heating the potassium salts of aromatic monocarboxylic acids in a substantially oxygen-free inert atmosphere to a temperature above about 340° C. and below the temperature at which substantial decomposition of the starting materials takes place to introduce a second potassium carboxyl group into said potassium monocarboxylic acid salts.

The upper limit of temperature at which the reaction can be carried out is determined by the decomposition temperature of the organic material used. In general, it is not necessary to exceed a temperature of about 450° C. to 500° C. although heating beyond this temperature for short periods of time is not harmful if substantial decomposition of the starting material is avoided.

The starting material, potassium benzoate, can be used in admixture of inert materials such as, for instance, sand, metal powders, metal shavings, turnings, borings and the like. Inert salts such as, for instance, potassium carbonate, potassium sulfate, potassium chloride and others may also be admixed with the potassium benzoate. Other inert salts such as the carbonates, sulfates, chlorides and similar salts of other metals may also be used.

The reaction can be noticeably advanced by the addition of catalysts such as metals, for instance lead, zinc, mercury, iron, cadmium, and their compounds such as oxides, organic and inorganic salts, etc., although other metals and compounds may be used.

Recovery of the terephthalic acid from the reaction mixture is comparatively simple due to the different solubilities of benzoic acid and terephthalic acid in water. In general, the procedure consists in dissolving the reaction mixture in water, filtering off impurities and precipitating the organic acids from the resulting solution by the addition of mineral or organic acids, such as hydrochloric acid, sulfuric acid, benzoic acid, phthalic acid, etc. Unchanged benzoic acid is then extracted with hot water from the resulting acid mixture, leaving terephthalic acid as an insoluble residue. Said terephthalic acid is readily obtained in a pure state by dissolving in alkaline solution, if desired, adding adsorbents, for instance activated charcoal, filtering said solution, and reprecipitating terephthalic acid by the addition of mineral or organic acids.

The unreacted benzoic acid can also be removed from the acid mixture by sublimation.

Potassium terephthalate, as it is obtained by said reaction, can also be used directly for producing derivatives of terephthalic acid. For instance, it can be converted into the dichloride or into its esters by the use of methods known in the industry.

The solution of benzoic acid recovered from the reaction mixture can again be used for further reaction to produce terephthalic acid after conversion into the potassium salt. Large amounts of benzene are produced in the course of the reaction of my invention in addition to the carboxylic acids produced.

The salt of benzoic acid required as starting material may be obtained by neutralizing benzoic acid in water with potassium, hydroxide or carbonate, or by any other method which produces potassium benzoate. Such benzoate salt solutions are then converted into the dry state in an especially advantageous manner by spray-drying. Thereby fine powders are obtained which have only a very slight moisture content and which are particularly suitable for carrying out the reaction according to my invention. It is, however, also possible to start with reaction mixtures which yield potassium benzoate. For example, mixtures of substantially anhydrous benzoic acid and potassium carbonate may be used. The reactants need not be present in stoichiometric proportions. If desired, one or the other component may be used in excess.

Other aromatic carboxylic acids can also be subjected to similar reaction according to my invention. For instance, when heating potassium salts of aromatic carboxylic acids, such as chlorobenzoic acid, toluic acids, naphthalene carboxylic acids, valuable products having more than one carboxylic group are obtained.

The following examples serve to illustrate the invention without, however, limiting the same thereto. The reactions described in these examples are carried out, if not otherwise stated, in an autoclave provided with a stirring device and having a capacity of 1000 cc. The stirring device consists of a high-grade steel stirrer. The autoclave is lined with a replaceable high-grade steel lining and is heated electrically.

The potassium benzoate serving as starting material in all the examples given is obtained by spray-drying an aqueous solution of said salt in a Krause spray-drying apparatus with hot air having a temperature of 110° C. The powder is kept overnight in a drying oven at 120° C. and is then filled into tightly-closed glass bottles or other airtight containers.

*Example 1*

53 gm. of potassium benzoate were mixed with 94 gm. of potassium carbonate and the mixture was heated in an autoclave provided with stirring device to 350° to 354° C. for six hours. Heating to said temperature required about one hour. Carbon dioxide was introduced under pressure at the beginning of the heating. The initial pressure in the cold was 50 atmospheres' gauge, and the highest pressure reached at the reaction temperature was 102 atmospheres' gauge. After cooling, the salt mixture was dissolved in 200 cc. of hot water. The solution was filtered, whereby dark impurities remained on the filter and the organic acids were precipitated from the filtrate by the addition of dilute hydrochloric acid. The mixture of the resulting acids was filtered on a suction filter and washed with a small amount of cold water. The washed mixture was then boiled with 200 cc. of water and was again filtered by suction. After washing the filter cake with a small amount of boiling water, a white water-insoluble residue remained on the filter which residue was dried at 120° C. for fourteen hours. 7 gm. of a light-colored dicarboxylic acid, which proved to be terephthalic acid, was obtained. The yield was 12.7% calculated upon the potassium benzoate starting material. If it is assumed that the potassium benzoate undergoes a rearrangement in the reaction according to this invention to produce potassium terephthalate and benzene, this yield value should be doubled to give the yield according to this assumption.

Said acid may be converted by means of phosphorus pentachloride into the dichloride and is then reacted with methanol. The resulting dimethyl ester has a melting point of 139° C. The mixed melting point with pure terephthalic acid dimethyl ester does not show any depression.

On cooling, most of the unreacted benzoic acid crystallizes from the aqueous extract. Said recovered benzoic acid may be again converted into its potassium salt and used again for further conversion into terephthalic acid.

*Example 2*

145 gm. of potassium benzoate were treated in an autoclave in the same manner as described in Example 1 at 400° to 403° C. for six hours. Heating to said temperature required about three hours. The initial carbon dioxide pressure was 40 atmospheres' gauge and the highest pressure reached during the reaction was 102 atmospheres' gauge. The reaction product had a moist appearance and had a strong benzene odor. The terephthalic acid was recovered from the reaction mixture as described in Example 1, whereby 550 cc. of water were used for dissolving the crude product and the same amount for extracting the unreacted benzoic acid from the precipitated terephthalic acid. 28 gm. of crude terephthalic acid, corresponding to a yield of 18.6% calculated on the potassium benzoate, were obtained. The mixed melting point of the dimethyl ester produced from said terephthalic acid (melting point: 140° C.) with pure terephthalic acid dimethyl ester does not show any depression. Unchanged benzoic acid was recovered from the mother liquors by crystallization.

*Example 3*

A mixture of 150 gm. of potassium benzoate and 150 gm. of potassium carbonate were treated at an initial carbon dioxide pressure of 40 atmospheres' gauge and a maximum pressure of 84 atmospheres' gauge at a temperature of 400° to 404° C. for six hours. Heating to said temperature required 3¼ hours. The reaction mixture was separated as described in Example 1, whereby 550 cc. of water were used for dissolving crude products and a like amount for extracting the unreacted benzoic acid from the precipitated carboxylic acids.

25 gm. of crude terephthalic acid, corresponding to a yield of 16% calculated on the potassium benzoate used, were recovered. The amount of the black residue removed by filtration was 4.1 gm.

*Example 4*

150 gm. of potassium benzoate having a water content of 0.7% were heated with 75 gm. of potassium carbonate to 450° to 455° C. for six hours. Heating to said temperature required 4½ hours. At the beginning of this example carbon dioxide was introduced under pressure into the autoclave. The initial pressure in the cold was 50 atmospheres' gauge and the maximum pressure at the reaction temperature was 158 atmospheres' gauge. After cooling, the dark gray reaction product, which had a faint odor of benzene, was dissolved in 800 cc. of hot water, and the solution was filtered, whereby 11 gm. of dark-colored impurities remained on the filter. The organic acids were precipitated from the filtrate by the addition of dilute hydrochloric acid, filtered by suction on a suction filter, and washed with a small amount of cold water. The resulting product was boiled with 550 cc. of water and then filtered by suction while still hot. After washing with a small amount of boiling water, a white water-insoluble residue remained which was dried at 110° C. for 48 hours. 41 gm. of a crude acid were obtained, which proved to be terephthalic acid. The yield was 26.4% calculated on the potassium benzoate.

The dimethyl ester produced from said acid in the usual manner and in a good yield had a melting point of 139° C. No melting point depression was observed by taking a mixed melting point of said ester with pure terephthalic acid dimethyl ester.

*Example 5*

150 gm. of potassium benzoate were heated with 6 gm. of iron oxide ($Fe_2O_3$) to 400° C. for six hours. Carbon dioxide was introduced into the autoclave at the beginning of the reaction under a pressure of 50 atmospheres' gauge. The maximum pressure at reaction temperature was 169 atmospheres' gauge. After cooling, the dark gray crude product which had a strong odor of benzene was dissolved in 500 cc. of water, heated to boiling and filtered. The filter residue was repeatedly washed with hot dilute soduim hydroxide solution. Hydrochloric acid was added to the combined filtrates to render them strongly acid. The acids precipitated thereby were filtered and were sepeatedly extracted with boiling water. A white water-insoluble residue of pure terephthalic acid remained. 36 gm. of terephthalic acid, corresponding to a yield of 23.2% calculated on the potassium benzoate, resulted.

15 gm. of benzoic acid were recovered from the mother liquors obtained on acid precipitation and extraction. The insoluble filter residue amounted to 12 gm.

*Example 6*

A mixture of 150 gm. of pottasium benzoate and 10 gm. of zinc oxide were heated in the same manner as described in Example 5 to 400° C. for six hours. The initial carbon dioxide pressure was 50 atmospheres' gauge and the maximum pressure reached during the reaction was 138 atmospheres' gauge. The crude product, having a strong odor of benzene, was separated in the same manner as described in Example 5. 20 gm. of terephthalic acid, corresponding to a yield of 12.9% calculated on the potassium benzoate, or 25.8% calculated according to the assumption stated in Example 1, were obtained. The insoluble filter residue amounted to 12 gm., and 23 gm. of benzoic acid were recovered.

*Example 7*

150 gm. of potassium benzoate were heated with 15 gm. of metallic zinc to 400° C. for six hours, as described in the preceding examples. The initial carbon dioxide pressure was 50 atmospheres' gauge and the maximum pressure was 140 atmospheres' gauge. On working up the light-gray reaction product, having an odor of benzene, 48 gm. of terephthalic acid were obtained, corresponding to a yield of 30.9% calculated on the potassium benzoate, or 61.8% calculated according to the assumption stated in Example 1; there were 18 gm. of an insoluble filter residue, and 8 gm. of benzoic acid were recovered.

*Example 8*

150 gm. of potassium benzoate were heated with 15 gm. of metallic lead in an autoclave to 400° C. for six hours in the manner described in the preceding examples. The initial carbon dioxide pressure was 50 atmospheres' gauge and the maximum pressure 132 atmospheres' gauge. On working up the dark-gray crude product, having an odor of benzene, 56 gm. of pure terephthalic acid, corresponding to a yield of 40% calculated on the potassium benzoate, or 80% calculated according to the assumption stated in Example 1, and 15 gm. of an insoluble filter residue were obtained. No benzoic acid can be recovered when proceeding in this manner.

*Example 9*

A mixture of 161 gm. potassium benzoate, 25 gm. potassium carbonate and 10 gm. cadmium oxide were heated in a vessel at 440° C. for four hours in an atmosphere of carbon dioxide at atmospheric pressure. After cooling, the product produced weighed 158 gm. and had a strong odor of benzene. 100 gm. of this product were dissolved in water. The resulting solution was heated to boiling and filtered. The filter cake was repeatedly washed with hot dilute sodium hydroxide. The filtrates were collected and combined and the combined solutions were acidified with hydrochloric acid until no further precipitate formed. This precipitate was filtered off and repeatedly extracted with boiling water. A white water-insoluble residue remained which was found to be pure terephthalic acid. 18.4 gm. of terephthalic acid were obtained, which corresponds to a yield of 8.75% calculated on the potassium benzoate or 17.5% calculated according to the assumption stated in Example 1.

*Example 10*

(a) In an electrically heated furnace which was provided with gas intake and exhaust valves, small troughs made of sheet iron, each containing 100 gm. potassium benzoate admixed with (1) 0.5 gm.
(2) 1.0 gm.
(3) 2.0 gm.
(4) 3.0 gm.

of cadmium fluoride as the catalyst, were heated for six hours at 440° to 450° C. internal temperature. Prior to the runs, the air in the furnace was displaced with carbon dioxide; during the heating one valve remained open, so that a superatmospheric pressure could not develop and so that the benzene formed during the reaction could at the same time escape and be condensed. 91 gm. benzene were recovered in this manner.

The heated reaction products were worked up in the usual fashion and yielded the following amounts of terephthalic acid in each of the cases as numbered above:

(1) 14.15 gm.=13.6% calculated on the potassium benzoate
(2) 13.75 gm.=13.25% calculated on the potassium benzoate
(3) 13.40 gm.=12.9% calculated on the potassium benzoate
(4) 14.95 gm.=14.4% calculated on the potassium benzoate (b) In the above-described apparatus, 4 small troughs made of sheet iron, each containing 100 gm. potassium benzoate admixed with (1) 0.5 gm.
(2) 1.0 gm.
(3) 1.5 gm.
(4) 2.0 gm.

of cadmium fluoride as a catalyst, were heated for six hours at 440 to 450° C. In contrast to part (a), however, the aparatus was flushed with carbon dioxide at intervals ranging from one-half hour to one hour. The solid reaction products obtained by treatment in accordance with previously described methods yielded the following quantities of terephthalic acid:

(1) 14.88 gm.=14.35% calculated on the potassium benzoate
(2) 15.95 gm.=15.4% calculated on the potassium benzoate
(3) 15.55 gm.=15.0% calculated on the potassium benzoate
(4) 14.10 gm.=13.6% calculated on the potassium benzoate In this example the percentage yield is twice that given when calculated according to the assumption stated in Example 1.

*Example 11*

161 gm. potassium benzoate, 64 gm. potassium carbonate and 10 gm. cadmium oxide were placed into a rotary autoclave. Thereafter, the interior of the autoclave was flushed with nitrogen and the pressure of nitrogen was adjusted to 10 atmospheres' gauge. Subsequently, the autoclave and its contents were heated to 450° C. and maintained at that temperature for approximately 6 hours. The highest pressure reached in the interior of the autoclave was 50 atmospheres' gauge. The product produced thereby was dissolved in water and subsequently treated as described in Example 1. The yield of terephthalic acid was 8.7% calculated on the potassium benzoate starting material.

*Example 12*

150 gm. of potassium benzoate were heated with 20 gm. benzene for six hours at 400° C. in an autoclave having a volume of 1 liter. The highest pressure reached was 38 atmospheres' gauge. A dark raw product, weighing 104 gm., was obtained. This product was dissolved in water; the solution was acidified with hydrochloric acid. The precipitated aromatic carboxylic acids were repeatedly extracted with boiling water. 28 gm. of terephthalic acid were obtained, which is 18% calculated on the potassium benzoate starting material and 36% when calculated according to the assumption stated in Example 1.

*Example 13*

150 gm. of potassium benzoate were heated in admixture with 3 gm. of cadmium oxide for six hours at 400° C. in a 1-liter autoclave. At the beginning of the experiment, nitrogen was introduced to a pressure of 50 atmospheres' gauge. The maximum pressure developed was 139 atmospheres' gauge. 125 gm. of a gray raw product, which had an odor of benzene, were obtained, and this product was worked up in the same manner as in the preceding Example 12. 35 gm. of terephthalic acid=22.4% calculated on the potassium benzoate.

Example 14

150 gm. of potassium benzoate were heated for six hours at 400° C. in a 1-liter autoclave. At the beginning of the experiment, ammonia gas (NH$_3$) was introduced to a pressure of 7 atmospheres' gauge. The maximum pressure which developed was 49 atmospheres' gauge. A dark raw product, weighing 122 gm. was obtained, from which 16 gm.=10.2% calculated on the potassium benzoate were isolated in the manner described in Example 12.

Example 15

1000 gm. of potassium benzoate and 25.2 gm. of CdCl$_2$ were mixed in a pebble mill for 4 hours and then dried at 150° C. overnight. A 51.2 gm. portion of the above mixture was weighed into a stainless-steel autoclave liner and the liner placed in a 500-ml. autoclave. The autoclave was flushed with argon and evacuated with an oil pump. This operation was repeated three times and then the autoclave was pressured to 150 p. s. i. g. with argon, sealed and heated to 440° C. for 1 hour. At a temperature of 440° C. the pressure in the autoclave reached 580 p. s. i. g. After cooling to 150° C., three samples of the off-gas were taken through a vacuum system previously flushed with argon. When the gas sample had been collected, the remainder of the off-gas from the reaction was vented through a Dry Ice trap system to collect condensable products (almost entirely benzene) and when the pressure reached atmospheric pressure the autoclave liner was removed from the autoclave. Weight of trap cut (benzene)=11.0 gm. (90.2% calculated on the assumption stated in Example 1). Weight of solid products in the autoclave liner=38.5 gm.

The solid products were washed from the autoclave liner into a 1-liter Erlenmeyer flask with water and the volume made up to approximately 400-ml. This mixture was heated to the boiling point and gravity filtered to remove water-insoluble reaction residue. The residue was washed with 300-ml. of boiling water. The filter paper and residue were dried at 50° C./25-mm. overnight. Weight of residue recovered=2.00 gm.

The combined filtrate and washings were made up to 1 liter with water and two 100-ml. aliquots were acidified with concentrated hydrochloric acid, diluted with 150-ml. of water, heated to the boiling point and filtered onto tared, sintered glass filters. The filter cakes were washed with 150-ml. of boiling water. The filters and filter cakes were dried overnight at 150° C. Weight of terephthalic acid recovered from first aliquot=2.130 gm. Second aliquot= 2.108 gm. Average=2.119 gm. (81.8% calculated on the assumption stated in Example 1).

The filtrate and washings from the recovery of terephthalic acid of both aliquots were combined and extracted with four 100-ml. portions of ether. The ether was removed from the combined ether extracts on the steam bath and the residue (benzoic acid) was dried by azeotropic distillation with chloroform. Weight of benzoic acid recovered=0.200 gm.

This amount of benzoic acid corresponds to 1.00 gm. of benzoic acid recoverable from the total reaction product and indicates that 97.4% of the potassium benzoate charged was reacted.

Yield of terephthalic acid=$\frac{81.8}{97.4} \times 100 = 84.2\%$ as calculated according to the assumption stated in Example 1. Yield of benzene=$\frac{90.2}{97.4} \times 100 = 92.5\%$ calculated according to the assumption stated in Example 1.

Example 16

This example was identical to the preceding except nitrogen was used in place of argon. The off-gas samples in this example were taken with a Dry Ice trap between the autoclave and the vacuum system and thus only traces of benzene were present in the sample. The data from the experiment are as follows:

Pressure attained at 440° C.=600 p. s. i. g.
Weight of solid reaction product=38.4 gm.
Weight of trap cut=10.2 gm. (83.7% calculated on the assumption stated in Example 1).
Weight of insoluble reaction residue=1.75 gm.
Weight of terephthalic acid recovered (average from two aliquots)=2.129 gm. (82.7% calculated on the assumption stated in Example 1).
Weight of benzoic acid recovered=0.229 gm.
Potassium benzoate reacted=97.2%

Yield of terephthalic acid=$\frac{82.7}{97.2} \times 100 = 85.2\%$ calculated on the assumption stated in Example 1.

Yield of benzene=$\frac{83.7}{97.2} \times 100 = 86.1\%$ calculated on the assumption stated in Example 1.

This application is a continuation-in-part of my copending application Serial Number 395,609, filed December 1, 1953, and contains some examples from a copending joint application Serial Number 472,246, filed November 30, 1954, now Patent No. 2,794,830.

While I have given several illustrative examples of the practice of my invention it will be understood that the invention may be practiced in other ways and that various modifications and changes may be made in the examples given without departing from the spirit of my invention or the scope of the following claims.

I claim:

1. In a process of producing aromatic monocyclic dicarboxylic acids from aromatic monocyclic monocarboxylic acids, the steps comprising converting said monocyclic monocarboxylic acids into potassium salts thereof, and heating said potassium salts in a substantially oxygen-free inert atmosphere to a temperature above about 340° C. and below the temperature at which substantial decomposition of the starting materials takes place to introduce a second potassium carboxyl group into said potassium monocyclic monocarboxylic acid salts.

2. In a process of producing aromatic monocyclic dicarboxylic acids from aromatic monocyclic monocarboxylic acids, the steps comprising converting said monocyclic monocarboxylic acids into potassium salts thereof, and heating said potassium salts in a substantially oxygen-free inert atmosphere containing carbon dioxide to a temperature above about 340° C. and below the temperature at which substantial decomposition of the starting materials takes place to introduce a second potassium carboxyl group into said potassium monocyclic monocarboxylic acid salts.

3. In a process of producing aromatic monocyclic dicarboxylic acids from aromatic monocyclic monocarboxylic acids, the steps comprising converting said aromatic monocyclic monocarboxylic acids into substantially dry potassium salts thereof, heating said substantially dry potassium salts in a substantially oxygen-free inert atmosphere to a temperature above about 340° C. and below the decomposition temperature of the starting materials until a substantial amount of dipotassium monocyclic dicarboxylic acid has been formed, dissolving said salts in water, converting said salts into the corresponding acids thereof and separating the monocyclic dicarboxylic acids from said solution.

4. In a process of producing salts of terephthalic acid, the step comprising heating the potassium salt of benzoic acid in a substantially oxygen-free inert atmosphere to temperatures above about 340° C. and not substantially in excess of 455° C. to introduce a second potassium carboxyl group into said benzoic acid salt.

5. In a process of producing salts of terephthalic acid, the step comprising heating the potassium salt of benzoic acid in a substantially oxygen-free inert atmosphere containing carbon dioxide to temperatures above about 340° C. and not substantially in excess of 455° C. to introduce a second potassium carboxyl group into said benzoic acid salt.

6. In a process of producing salts of aromatic monocyclic dicarboxylic acids, the step comprising heating the potassium salt of an aromatic monocyclic monocarboxylic acid in a substantially oxygen-free inert atmosphere and in the presence of inert materials to a temperature above 340° C. and below the decomposition temperature of said starting material to introduce a second potassium carboxyl group into said monocyclic monocarboxylic acid salt.

7. In a process of producing salts of terephthalic acid, the step comprising heating the potassium salt of benzoic acid in a substantially oxygen-free inert atmosphere of carbon dioxide under pressure and in the presence of inert materials to a temperature above 340° C. and below the decomposition temperature of said starting material to introduce a second potassium carboxyl group into said benzoic acid salt.

8. In a process of converting benzoic acid into terephthalic acid, the steps comprising heating the finely comminuted, substantially dry potassium salt of benzoic acid in a substantially oxygen-free inert atmosphere under a pressure between about 40 atmospheres' gauge and about 170 atmospheres' gauge to a temperature between about 340° C. and about 450° C. for about six hours, while thorouhly agitating, dissolving the reaction mixture containing dipotassium terephthalate in water, precipitating the carboxylic acids from the resulting aqueous solution by the addition of a mineral acid, filtering off the precipitated carboxylic acids, boiling said carboxylic acids with water, and filtering the resulting mixture while hot to separate undissolved terephthalic acid from the mother liquors.

9. In a process of converting benzoic acid into terephthalic acid, according to claim 8, wherein a mixture of potassium benzoate and a potassium salt is used as starting material.

10. In a process of converting benzoic acid into terephthalic acid according to claim 8, wherein a mixture of potassium benzoate and potassium carbonate is used as starting material.

11. The method of producing aromatic monocyclic dicarboxylic acids from aromatic monocyclic monocarboxylic acids which comprises subjecting the aromatic monocyclic monocarboxylic acids to heat above 340° C. and below the decomposition temperature of said starting material and pressure above 40 atmospheres' gauge in a substantially oxygen-free inert atmosphere and in the presence of potassium carbonate until a second potassium carboxyl group has been introduced into the aromatic nucleus.

12. The method of producing potassium terephthalate from potassium benzoate which comprises subjecting potassium benzoate to heat above 340° C. and below the decomposition temperature of said starting material and pressure above 40 atmospheres' gauge in a substantially oxygen-free inert atmosphere of carbon dioxide and in the presence of a potassium salt until a second potassium carboxyl group has been introduced into said benzoic acid salt.

13. The method of producing aromatic monocyclic dicarboxylic acids from aromatic monocyclic monocarboxylic acids which comprises converting said aromatic monocyclic monocarboxylic acids into potassium salts thereof, heating said salts in a subtsantially dry state and in a substantially oxygen-free inert atmosphere to a temperature between about 340° C. and not substantially above 455° C. until a substantial amount of dipotassium salts of aromatic monocyclic dicarboxylic acids has been produced, converting said potassium salts of the dicarboxylic acids and the monocarboxylic acids into the corresponding acids and separating the dicarboxylic acids from the monocarboxylic acids.

14. The method of producing terephthalic acid from benzoic acid which comprises converting the benzoic acia into potassium benzoate, drying the potassium benzoate and heating the dry potassium benzoate in an inert atmosphere substantially free of oxygen to a temperature between about 340° C. and below the decomposition temperature of potassium benzoate until a substantial amount of dipotassium terephthalate has been produced and converting the dipotassium terephthalate into terephthalic acid and separating the terephthalic acid from the remainder of the reaction mixture.

15. The method of producing terephthalic acid from benzoic acid which comprises converting the benzoic acid into potassium benzoate, drying the potassium benzoate and heating the dry potassium benzoate in an inert atmosphere substantially free of oxygen and containing carbon dioxide, to a temperature between about 340° C. and below the decomposition temperature of potassium benzoate until a substantial amount of dipotassium terephthalate has been produced and converting the dipotassium terephthalate into terephthalic acid and separating the terephthalic acid from the remainder of the reaction mixture.

16. In a process for producing salts of aromatic monocyclic dicarboxylic acids, the step comprising heating the potassium salt of an aromatic monocyclic monocarboxylic acid in a substantially oxygen-free inert atmosphere to a temperature above about 340° C. and below the temperature at which substantial decomposition of the starting materials takes place to introduce a second potassium carboxyl group into said potassium monocarboxylic acid salt.

17. In a process for producing salts of terephthalic acid, the step comprising heating the potassium salt of a benzoic acid in a substantially oxygen-free inert atmosphere to a temperature above about 340° C. and below the temperature at which substantial decomposition of the starting materials takes place to introduce a second potassium carboxyl group into said potassium salt of benzoic acid.

No references cited.

UNITED STATES PATENT OFFICE

CERTIFICATE OF CORRECTION

Patent No. 2,823,229                                      February 11, 1958

Bernhard Raecke

It is hereby certified that error appears in the printed specification of the above numbered patent requiring correction and that the said Letters Patent should read as corrected below.

Columns 3 and 4, Examples 1 to 6, columns 5 and 6, Examples 7, 8, 11, 12 and 13, and column 7, Example 14, wherever the term "atmospheres' gauge" appears read --atmospheres gauge--; column 4, line 52, for "soduim" read --sodium--; line 65, for "pottasium" read --potassium--; column 5, line 63, for "tempearture" read --temperature--; column 9, lines 24, 25, 48 and 57, for "atmospheres' gauge", each occurrence, read --atmospheres gauge--.

Signed and sealed this 3rd day of June 1958.

(SEAL)
Attest:

KARL H. AXLINE

Attesting Officer

ROBERT C. WATSON
Commissioner of Patents